March 6, 1951     L. E. OLSON     2,544,350
CATALYTIC CONVERSION OF HYDROCARBONS
Filed June 26, 1947
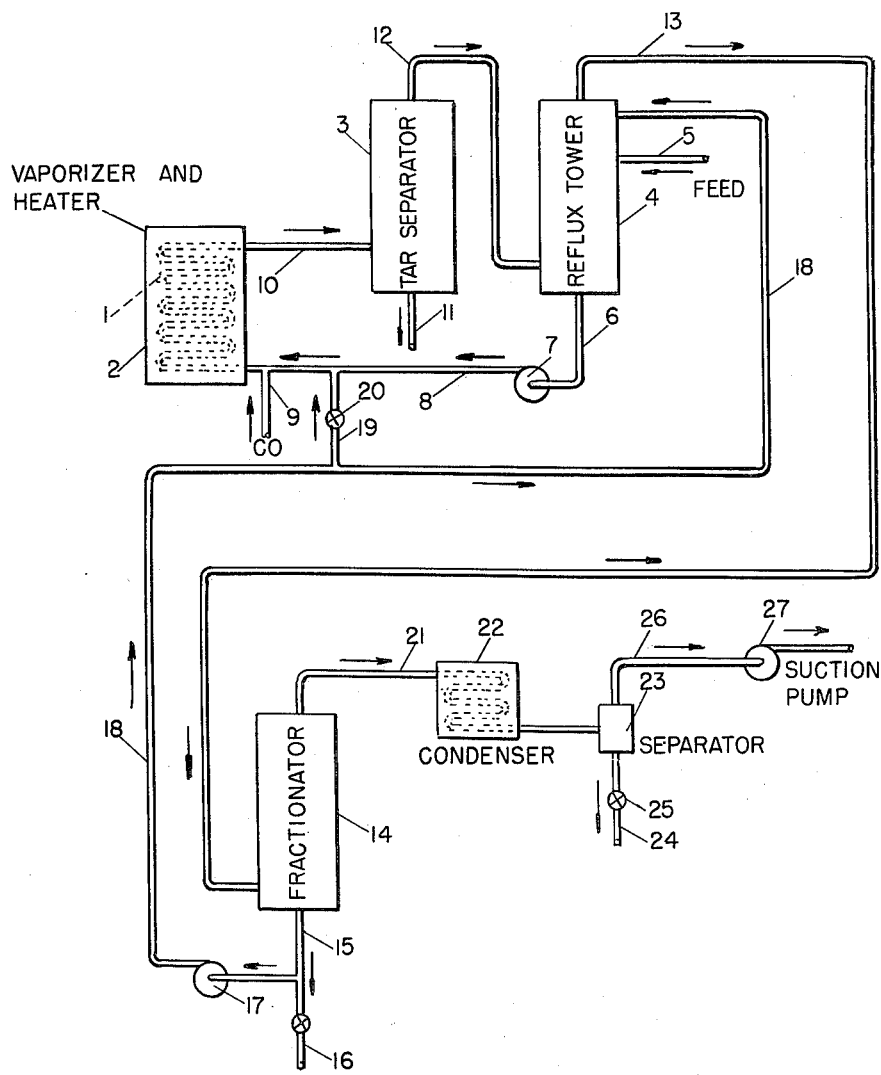
INVENTOR.
LEONARD EUGENE OLSON
ATTORNEYS Patented Mar. 6, 1951

2,544,350

UNITED STATES PATENT OFFICE 2,544,350

CATALYTIC CONVERSION OF HYDROCARBONS

Leonard Eugene Olson, Chicago, Ill., assignor to Sinclair Refining Company, New York, N. Y., a corporation of Maine Application June 26, 1947, Serial No. 757,311

4 Claims. (Cl. 196—54)

The present invention relates to the pyrolytic conversion of hydrocarbons and, more particularly, to pyrolytic conversion processes whereby hydrocarbon oils are cracked in the vapor phase in contact with a homogeneous catalyst and comprises an improved process whereby the hydrocarbon oils are cracked at an elevated temperature in the vapor phase in the presence of anhydrous aluminum chloride vapors.

Aluminum chloride has previously been proposed as a catalyst in the cracking of hydrocarbon oils, for instance, by the process known to the art as the McAfee process, in which a suspension of aluminum chloride in a large body of heavy hydrocarbon oil in liquid phase is heated at atmosphheric, or higher, pressure with constant agitation.

More recently, the use of anhydrous aluminum chloride as a homogeneous cracking catalyst in vapor phase operation, under an absolute pressure of two pounds per square inch or lower, has been proposed. My present invention constitutes an improvement in the use of aluminum chloride as a homogeneous cracking catalyst in the vapor phase and provides a method whereby such operation may be accomplished while avoiding the necessity of using such low absolute pressures in the system.

In accordance with my present invention, anhydrous aluminum chloride and hydrocarbon vapors to be converted are heated in the reaction zone as a homogeneous mixture. However, I avoid the necessity of the use of low absolute pressures in the system by conducting the conversion in the presence of carbon monoxide in an amount sufficient to lower the partial pressure on the aluminum chloride sufficient to effect its vaporization, under conditions approximating atmospheric pressures in the system.

In addition to lowering the partial pressure on the aluminum chloride, the presence of the carbon monoxide also lowers the partial pressure on the hydrocarbons so as to effect their vaporization, or more complete vaporization, as well as complete vaporization of the aluminum chloride, at moderate cracking temperatures and pressures. Further, in the presence of aluminum chloride, the carbon monoxide appears to have a tendency to react with the hydrocarbons undergoing conversion, or with the products of the conversion, in a way which improves the characteristics of the product.

While sub-atmospheric pressures are not ordinarily required, such pressures may frequently be used with advantage, particularly where a relatively high boiling charge oil is being cracked under moderate cracking temperatures.

Carbon monoxide which I use in accordance with my present invention, should be anhydrous and may be substantially pure carbon monoxide, or an anhydrous gas rich in carbon monoxide.

The process will be further described and illustrated with reference to the accompanying drawing which represents conventionally, and somewhat diagrammatically, a flow diagram of one embodiment of my invention.

The apparatus indicated by the reference numeral 1 of the drawing is a tubular or coil heater, located in a heating furnace 2, and heated by any suitable means, for instance, hot products of combustion from a furnace, not shown. A tar separator of conventional type, is indicated at 3, and 4 represents a reflux tower.

Fresh feed, for instance, gas oil, admixed with a small proportion of aluminum chloride, is charged to the reflux tower 4 through line 5 and passes downwardly therethrough countercurrent to an upwardly rising stream of hot oil vapors. The reflux tower bottoms pass from the tower through line 6 and are forced by pump 7 through line 8 into and through the vaporizer, or heater, 1. Carbon monoxide is passed into the stream of oil through line 9, just before, or as it enters heat coil 1.

In passing through the heater, the oil and aluminum chloride contained therein are vaporized in the presence of the carbon monoxide and the oil cracked. The vapors, together with any unvaporized material, pass from the heater through line 10 to the tar separator 3 wherein the vapors are separated from unvaporized material, the latter being withdrawn through line 11 from the bottom of the tar separator and removed from the system.

The vapors pass from the top of the tar separator, together with carbon monoxide and aluminum chloride vapors, through line 12 to the lower part of the reflux tower 4 and pass upwardly through the tower, countercurrent to the mixture of feed oil and aluminum chloride introduced through line 5.

The reflux tower is advantageously of the bubble tower type, though other conventional type towers adapted to provide adequate contact between the rising vapors and the descending oil may be used. By this countercurrent flow, insufficiently cracked oil and aluminum chloride present in the oil vapors passed to the tower, are condensed and effectively washed from the oil vapors, carried to the bottom of the tower and returned to the heating coil, together with unvaporized incoming fresh feed oil and aluminum chloride.

The oil vapors substantially free from aluminum chloride and containing carbon monoxide pass from the reflux tower through line 13 to the fractionator 14 in which further separation of lighter and heavier fractions is effected and from which the heavier fraction may be withdrawn through line 15 and either removed from the system through valved line 16, or recycled through the heater by means of pump 17 through line 18 and line 19, controlled by valve 20, and line 8, or may be returned by line 18 to the reflux tower, either separately or together with fresh feed oil.

The light fraction passes from the top of the fractionator through line 21 and condenser 22 to the separator 23 in which separation of the distillate and uncondensed vapors and gases is effected. The distillate is withdrawn from the separator through line 24, in which there is interposed a valve 25. The gases and uncondensed vapors pass from the separator through line 26, in which there may be interposed vacuum pump 27 for use when it is desirable to operate the system under sub-atmospheric pressure, or to draw the vapors through the system where the pressure on the reaction zone is insufficient to force the vapors through the system.

In the operation described, a pressure approximating atmospheric pressure, or even a sub-atmospheric pressure, may be maintained throughout the system by means of the vacuum pump, or by other suitable exhausting means. By cooling and condensing the product under sub-atmospheric pressure, the tendency for the product to polymerize in the presence of aluminum chloride is materially reduced.

As previously noted, the pressure on the system is subject to some variation, depending upon the particular oil being cracked and other operating conditions. Absolute pressure on the hydrocarbons undergoing cracking may, with advantage, not exceed about two pounds per square inch. However, higher pressures may be employed, the maximum permissible pressure being limited to that at which the aluminum chloride is substantially completely vaporized under the operating conditions maintained in the reaction zone. This will depend upon the proportion of carbon monoxide present in the conversion zone and also somewhat upon the characteristics of the oil being cracked.

The proportion of aluminum chloride used is, likewise, subject to some variation, depending upon the particular charge oil and other operating conditions. Proportions of about 1% anhydrous aluminum chloride, based on the weight of the oil, are generally satisfactory.

By the use of carbon monoxide, in accordance with my invention, the tendency for some of the aluminum chloride to separate with the tar in the tar separator, and thus be removed from the system, is minimized and, accordingly, a larger proportion of unconsumed aluminum chloride is recovered from the vapors in the reflux tower and returned to the cracking zone. Sufficient additional aluminum chloride should be added to the system, either together with the fresh feed oil, or otherwise, so as to maintain an aluminum chloride concentration in the oil in the reaction zone at about 1%, based on the weight of the oil.

The reaction temperature, that is, the maximum temperature to which the mixture of oil and aluminum chloride vapors is heated, should usually be within the range of about 500° to 700° F., the optimum reaction temperature depending primarily upon the characteristics of the particular charge oil and the extent of cracking required. The charge oil may be a gas oil fraction, or other fractions, substantially completely vaporized under the conditions maintained in the conversion zone.

In order to separate the aluminum chloride substantially completely from the oil vapors in the reflux tower, the head temperature of the tower should not exceed about 350° F., and may, with advantage, be somewhat lower. The head temperature of the tower may be controlled by conventional means, for instance, by returning a portion of light distillate to the upper end of the tower, as shown in the particular operation illustrated.

It will be understood that the invention is not limited with respect to the type of apparatus in which the process is carried out. For instance, in place of the coil heater illustrated and specifically described, other types of reaction vessels, for example, a reactor of the retort type, wherein the mixed vapors may be maintained under conversion conditions for a period of time sufficient to effect the desired cracking may be used.

I claim:

1. In a process for converting heavier hydrocarbons to lighter hydrocarbons wherein the hydrocarbon charge oil to be converted is heated to a cracking temperature and cracked in a conversion zone and vaporized effluent from the conversion zone passed through a tar separating zone, wherein tar is separated from the effluent, remaining vapors being passed to a refluxing zone, the charge oil introduced into the refluxing zone into contact with the vapors therein, whereby the vapors are partially condensed, and liquid hydrocarbons from the refluxing zone, including charge oil and condensed vapors, are passed to the conversion zone, the steps of charging aluminum chloride to the refluxing zone and passing it therefrom to the conversion zone together with the charge oil and reflux condensate, mixing carbon monoxide gas with the mixture of charge oil and reflux condensate prior to the entrance of the mixture to the conversion zone and vaporizing and heating the resultant mixture in the conversion zone to a temperature of 500 to 700° F. for a period of time sufficient to effect the desired conversion, the carbon monoxide being present in the mixture in an amount such that the aluminum chloride is substantially completely vaporized under the temperature and pressure conditions in the conversion zone and in the tar separating zone.

2. The process of claim 1 in which the pressure in the conversion zone is not substantially in excess of atmospheric pressure.

3. The process of claim 1 in which the proportion of aluminum chloride used is about 1%, based on the weight of the oil.

4. The process of claim 1 in which the absolute pressure of the hydrocarbons undergoing conversion does not exceed about 2 pounds per square inch.

LEONARD EUGENE OLSON.

REFERENCES CITED

The following references are of record in the file of this patent:

UNITED STATES PATENTS

| Number | Name | Date |
|---|---|---|
| 1,381,098 | Alexander et al. | June 14, 1921 |
| 1,578,049 | McAfee | Mar. 23, 1926 |
| 1,936,539 | Lelgeman | Nov. 21, 1933 |
| 2,050,025 | Sullivan et al. | Aug. 4, 1936 |